(12) United States Patent
AbuSamra et al.

(10) Patent No.: US 7,306,084 B2
(45) Date of Patent: Dec. 11, 2007

(54) DYNAMIC MODIFICATION OF CENTRIFUGAL CLUTCH

(75) Inventors: Muneer AbuSamra, Southern Pines, NC (US); Ludger Ronge, Eriskirch (DE); Charles E. Allen, Jr., Rochester Hills, MI (US); Winfried Sturmer, Euerbach (DE); Karl-Fritz Heinzelmann, Meckenbeuren (DE); Loren Christopher Dreier, Vass, NC (US); Robert Anthony Sayman, Laurinburg, NC (US); James Henry DeVore, Laurinburg, NC (US); Ronald Peter Muetzel, Friedrichshafen (DE)

(73) Assignee: ZF Meritor, LLC, Maxton, NC (US)

( * ) Notice: Subject to any disclaimer, the term of this patent is extended or adjusted under 35 U.S.C. 154(b) by 302 days.

(21) Appl. No.: 10/745,095

(22) Filed: Dec. 23, 2003

(65) Prior Publication Data

US 2005/0133336 A1    Jun. 23, 2005

(51) Int. Cl.
*F16D 43/08*    (2006.01)

(52) U.S. Cl. .................. 192/105 CP; 192/103 A; 192/110 R

(58) Field of Classification Search ........... 192/105 B, 192/103 A, 110 R, 111 R, 105 CP
See application file for complete search history.

(56) References Cited

U.S. PATENT DOCUMENTS

| | | |
|---|---|---|
| 1,995,406 A | 3/1935 | Tower |
| 2,002,699 A * | 5/1935 | Larsen ............... 192/103 R |
| 2,071,588 A | 2/1937 | Swennes et al. |
| 3,001,623 A * | 9/1961 | Fawick ............... 192/105 B |
| 3,580,372 A | 5/1971 | Schlefer et al. |
| 4,081,065 A | 3/1978 | Smyth et al. |
| 4,111,291 A | 9/1978 | Horstman |
| 5,070,984 A * | 12/1991 | Fehring ............... 192/105 B |
| 6,533,056 B1 * | 3/2003 | Maimone ............... 180/230 |
| 2002/0137595 A1 | 9/2002 | Markyvech et al. |
| 2002/0137596 A1 | 9/2002 | Markyvech |
| 2002/0137597 A1 | 9/2002 | Genise et al. |
| 2005/0121284 A1 * | 6/2005 | Abusamra et al. ...... 192/105 B |

FOREIGN PATENT DOCUMENTS

| | | |
|---|---|---|
| DE | 831507 | 2/1952 |
| DE | 906 176 | 3/1954 |
| DE | 1104356 | 4/1961 |
| DE | 2743400 | 3/1979 |
| DE | 30 45 840 | 7/1982 |
| DE | 3226231 | 1/1984 |
| EP | 0668453 | 8/1995 |
| JP | 55044166 A * | 3/1980 |
| WO | WO 02/48530 | 6/2002 |

* cited by examiner

*Primary Examiner*—Richard M. Lorence
(74) *Attorney, Agent, or Firm*—Carlson, Caskey & Olds

(57) ABSTRACT

A centrifugal clutch assembly includes movable centrifugal weight reaction surfaces that provide for actuation at varying rotational speeds. A radially movable front plate with a ramped surface changes the radial position at which the centrifugal weight begins moving the front plate axially to compress a clamp spring and begin clutch actuation. An axially movable back plate moves axially to change the magnitude of compression caused by axial movement of the front plate. The changes to clamping force corresponding to movement of the reaction surfaces of the centrifugal weight change the rotational speed required to beginning and maintain actuation of the clutch assembly.

13 Claims, 4 Drawing Sheets

DYNAMIC MODIFICATION OF CENTRIFUGAL CLUTCH

BACKGROUND OF THE INVENTION

This invention relates to a normally open clutch assembly, and specifically to a normally open clutch assembly controllable to modify rotational speed required for actuation.

Typically a centrifugal clutch assembly includes at least one friction disk rotatable to drive an output shaft. Pressure plates move axially to clamp the friction disks in response to movement of a front plate. A centrifugal weight moves radially outward in response to rotation of the clutch assembly. Rollers of the centrifugal weights move up a ramped surface of the front plate to move the front plate axially. Axial movement of the front plate compress a clamp spring and forces engagement between the pressure plates and the friction disks.

Conventional centrifugal clutches begin actuation within a desired range of rotational speed. The rotational speed required for clutch actuation is substantially fixed and does not provide for adaptation to current vehicle operating conditions. In some instances it may be desirable to begin or maintain clutch engagement at slower speeds, such as when coasting or moving downhill. Further it may be desirable to begin engagement at higher engine speeds, or slip the clutch such as when moving or starting on a steep grade.

Accordingly, it is desirable to develop a centrifugal clutch assembly that is controllable to modify engagement and actuation at various rotational speeds.

SUMMARY OF THE INVENTION

The present invention is a centrifugal clutch assembly with movable centrifugal weight reaction surfaces for varying the rotational speed of clutch assembly actuation.

The centrifugal clutch assembly of this invention includes a radially movable front plate with a ramped surface. Radial movement of the front plate changes the radial position at which the centrifugal weight begins moving the front plate axially to compress the clamp spring and begin clutch actuation. The change in radial position of the ramped surface controls the rotational speed required to begin or maintain actuation of the clutch assembly.

Another centrifugal clutch assembly of this invention includes an axially movable back plate. The back plate moves axially to change the magnitude of compression caused by axial movement of the front plate and thereby the amount of clamping force. The changes to clamping force result in a change of rotational speed required for beginning and maintaining actuation of the clutch assembly.

Accordingly, the centrifugal clutch assembly of this invention provides for the modification and control of clutch engagement at various rotational speeds.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
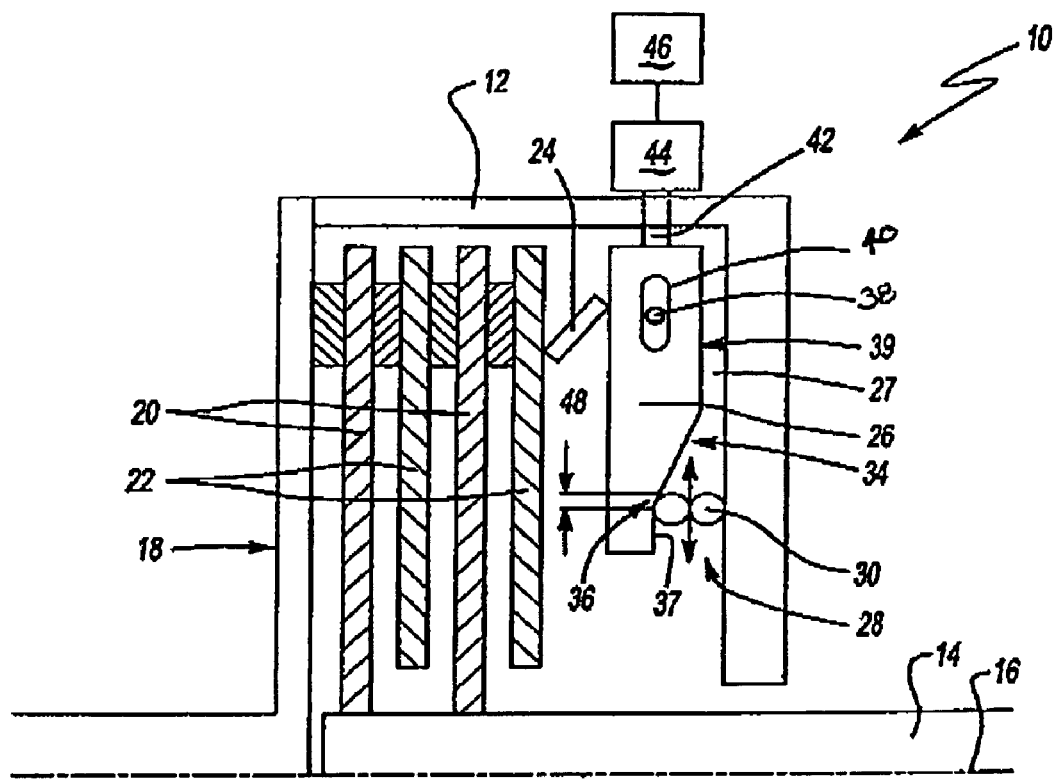
FIG. 1 is a schematic view of a centrifugal clutch assembly according to this invention.

Referring to FIG. 1, a centrifugal clutch assembly 10 is schematically shown and includes a clutch cover 12 mounted to a flywheel 18. The flywheel 18 and clutch cover 12 rotate about an axis 16 to transmit torque to an output shaft 14. The clutch assembly 10 includes at least one friction disk 20 rotatable to drive the output shaft 14. Pressure plates 22 are movable axially to clamp the friction disks 20. The pressure plates 22 move axially in response to movement of a front plate 26. A centrifugal weight 28 includes rollers 30 that move within a space 27 defined between the front plate 26 and the clutch cover 12.

Rotation of the clutch assembly 10 creates a centrifugal force that drives the centrifugal weights 28 radially outward and up a ramped portion 34 of the front plate 26. Movement of the rollers 30 up the ramped portion 34 moves the front plate 26 axially to compress a clamp spring 24. The clamp spring 24, in turn, forces the pressure plates 22 into clamping engagement with the friction disks 20.

Radial movement of the centrifugal weights 28 is dependent on the centrifugal force developed by rotation of the clutch assembly 10. A transition point 36 between a first flat portion 37 and the ramped portion 34 of the front plate 26 is the point where compression of the clamp spring 24 begins. Clamping force is increased as the centrifugal weights 28 move upward toward a second flat portion 39. The centrifugal force required to move the centrifugal weight 28 radially corresponds to a rotational speed of the clutch assembly 10. The front plate 26 is movable radially to modify the rotational speed at which the centrifugal weight 28 begins movement up the ramped portion 34 and thereby begins compression of the clamp spring 24.

A pin 38 is disposed within a slot 40 defined within the front plate 26. An adjustable member 42 is attached to move the front plate 26 radially. Radial movement of the front plate 26 changes the radial position of the transition point 36. Movement of the transition point 36 changes the point that the rollers 30 engage the ramped portion 34 and begin compressing the clamp spring 24. This movement of the transition point 36 changes the rotational speed at which the clutch assembly 10 begins transmitting torque to the output shaft 14.

An actuator 44 drives the adjustable member 42 to change the radial position of the front plate 26. Radial adjustment of the front plate 26 modifies a distance 48 between the transition point 36 and the centrifugal weight 28 at rest.

FIG. 1, schematically illustrates the centrifugal weight 28 at a position on the first flat portion 37. The front plate 26 is shown in a neutral position centered within the range of radial movement.

Figure 2:
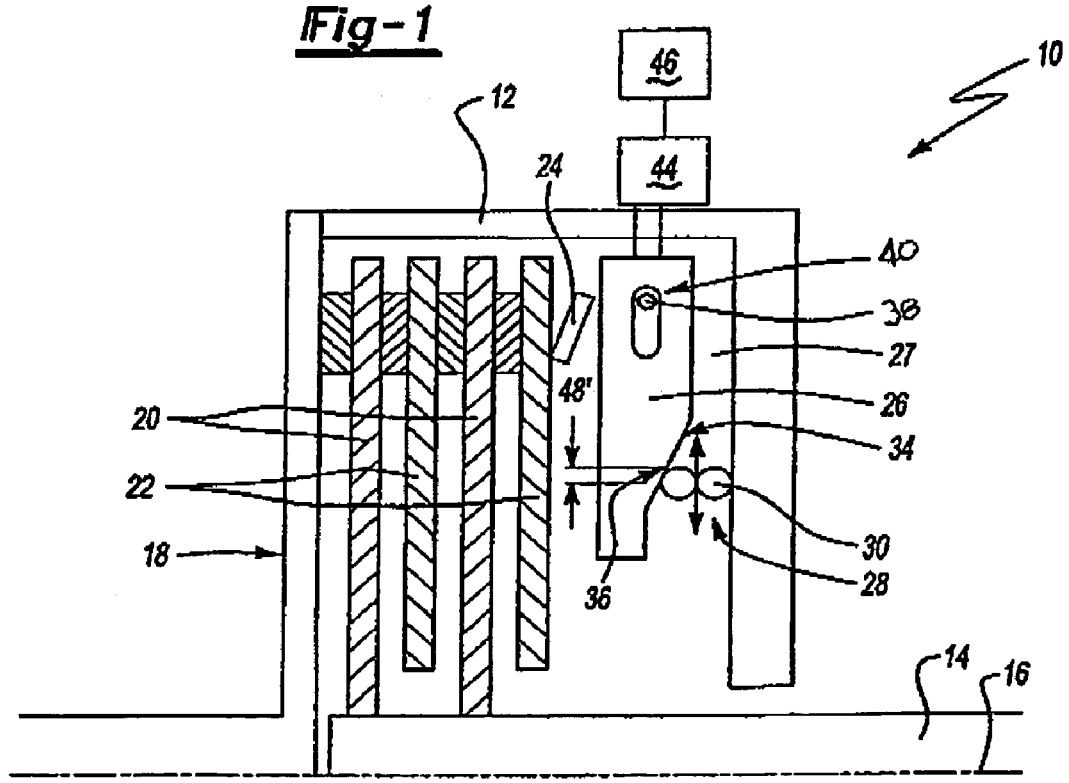
FIG. 2 is a schematic view of the centrifugal clutch assembly with a front plate moved radially inward.

Referring to FIG. 2, the front plate 26 is illustrated in an exaggerated position toward the shaft 14 to cause engagement of the clutch assembly 10 at a lowered rotational speed. The distance 48' is the distance at which the rollers 30 are past the transition point 36. In the position shown in FIG. 2, the front plate 26 is moved radially toward the shaft 14 such that the centrifugal weight 28 forces axial movement and engagement between the pressure plates 22 and the friction disks 20 prior to rotation of the clutch assembly 10.

Figure 3:
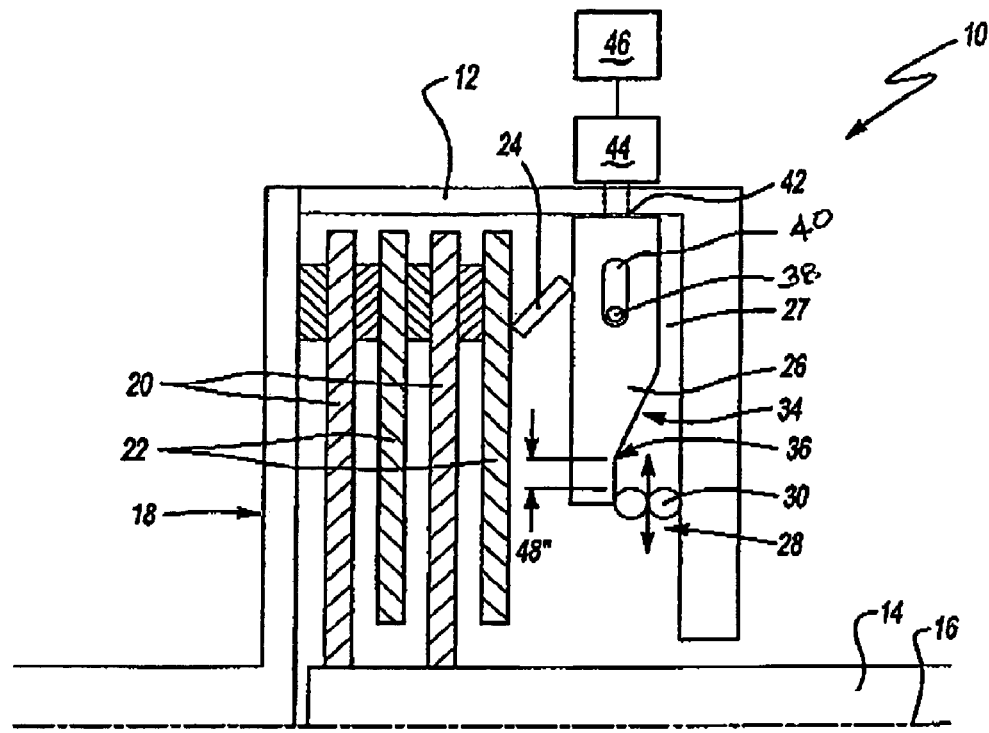
FIG. 3 is a schematic view of the centrifugal clutch assembly with the front plate moved radially outward.

Referring to FIG. 3, the front plate 26 is moved to a radial position furthest away from the shaft 14. In this position, the distance 48" between the rollers 30 of the centrifugal weight 28 and the transition point 36 is increased. The increased distance 48" from the transition point 36 requires an increased rotational speed of the clutch assembly 10 to begin engagement.

The actuator 44 drives the adjustable member 42 to continually adjust the rotational speed at which the clutch assembly begins engagement. A controller 46 controls the actuator 44 to vary the radial position of the face plate 26. The controller 46 is as known, and a worker skilled in the art with the benefit of this disclosure would understand how to program a commercially available controller to vary the radial position of the front plate 26 to change the engagement point of the clutch assembly 10.

Figure 4:
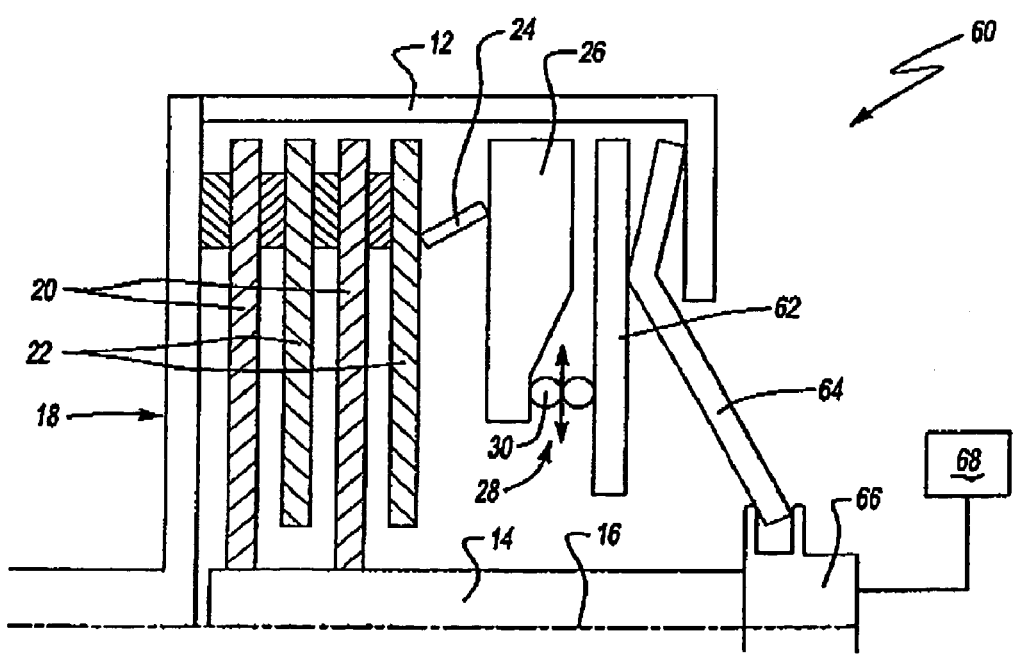
FIG. 4 is a schematic view of another centrifugal clutch assembly with an axially movable back plate.

Referring to FIG. 4, another clutch assembly 60 according to this invention includes an axially movable back plate 62. A release bearing 66 movable along the output shaft 14 moves a diaphragm spring 64 to cause axial movement of the back plate 62. The release bearing 66 is moved by a drive 68. The drive 68 can be manually or automatically actuated to adjust the axial position of the back plate 62.

Axial movement of the back plate 62 changes the amount of compression from the clamp spring 24 caused by axial movement of the front plate 26. The change in compression of the clamp spring 24 relative to radial movement of the centrifugal weight 28 changes the rotational speed at which the clutch assembly 60 begins engagement. The correlation between rotational speed of the clutch assembly 60 and compression of the clamp spring 24 provides for the continual adjustment of clutch engagement during operation.

In operation, rotation of the clutch assembly 60 generates a centrifugal force that drives the centrifugal weight 28 radially outward, causing axial movement of the front plate 26 and compression of the clamping spring 24. If the back plate 62 remains in an axially fixed position, compression of the clamp spring 24 will occur at substantially the same rotational speed, because the centrifugal weight 28 will cause axial movement at a substantially constant axial speed. Movement of the back plate 62 modifies the magnitude of compression of the clamp spring 24 that corresponds to axial movement of the front plate 26.

The release bearing 66 is movable by the drive 68 to adjust engagement of the friction disks 20 and pressure plates. Such an adjustment is made in response to dynamic conditions of the vehicle and desired clutch engagement.

Referring to FIG. 4, the clutch assembly 60 is schematically shown with the back plate 62 moved rearward to substantially reduce the amount of clamp spring 24 compression resulting from axial movement of the front plate 26. The magnitude of axial movement of the front plate 26 remains constant. Movement of the back plate 62 changes the affect movement of front plate 26 has on the clamp spring 24. As shown in FIG. 4, the release bearing 66 is moved rearward, away from the flywheel 18 to move the diaphragm spring 64, and the back plate 62 away from the clamp spring 24. Movement away from the clamp spring 24 reduces the magnitude of clamping force provided by axial movement of the front plate 26 responsive to rotation of the clutch assembly 10.

Figure 5:
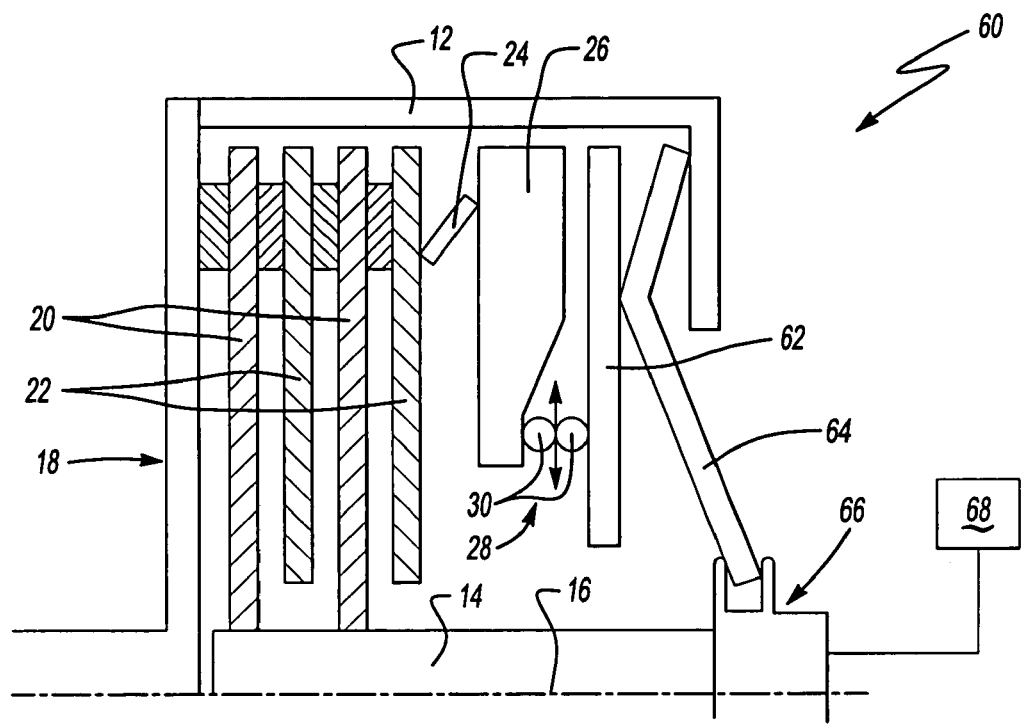
FIG. 5 is a schematic view of the centrifugal clutch assembly of FIG. 4 with the back plate moved rearward.

Referring to FIG. 5, movement forward of the back plate 62 will increase the magnitude of clamping force corresponding to axial movement of the front plate 26. The increase in clamping force provides for engagement at lower rotational speeds. The modification of engagement points provides for dynamic alteration and control of clutch engagement.

Figure 6:
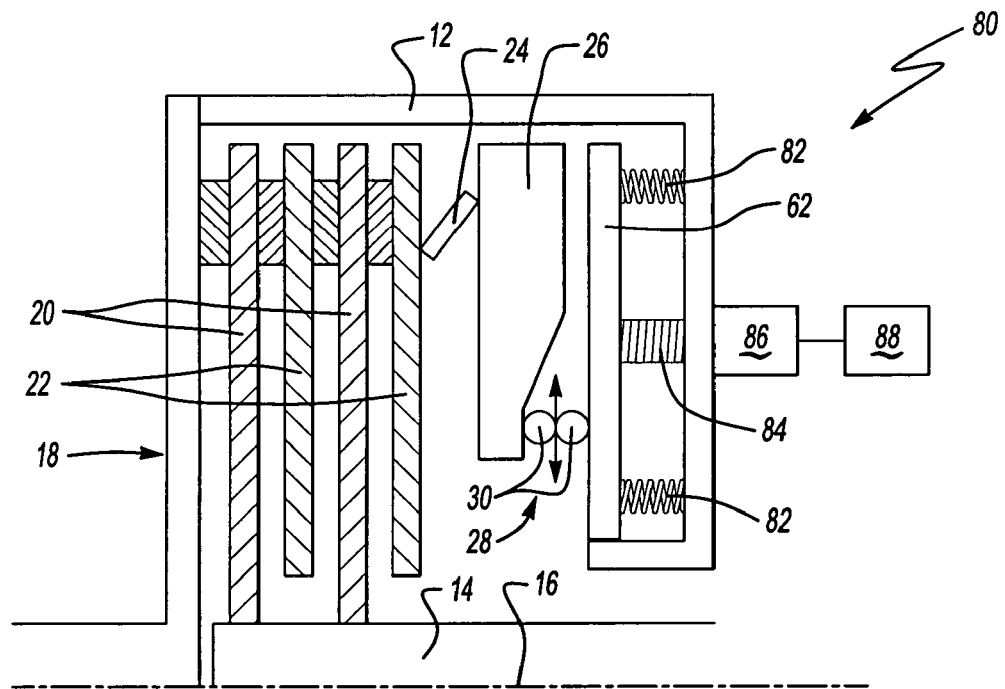
FIG. 6, is a schematic view of another centrifugal clutch assembly.

Referring to FIG. 6, another clutch assembly 80 is schematically shown and includes the axially movable back plate 62. An adjustable member 84 drives the back plate 62 axially. The adjustable member 84 is driven by a drive 86 controlled by controller 88. Biasing members 82 bias the back plate 62 axially toward an engaged position. The adjustable member 84 constrains and controls axial movement.

Preferably, the adjustable member 84 is a shaft that is movable by the drive 86. The drive 86 can be, for example, a pneumatic or hydraulic cylinder, an electric motor or a lever. The controller 88 can be an independent dedicated controller for the clutch assembly 80 or part of a larger vehicle controller. The controller 88 controls actuation of the drive 86 to dynamically adjust the engagement point of the clutch assembly 80 according to current operating and vehicle conditions.

Figure 7:
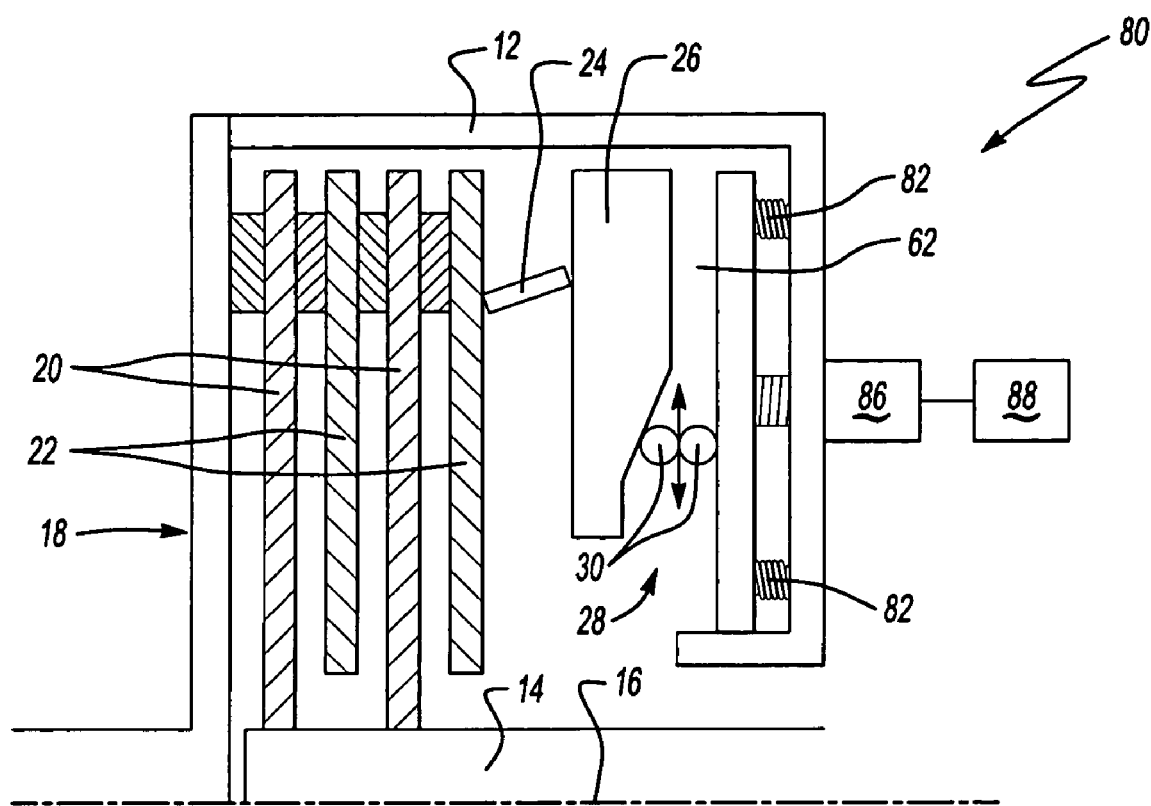
FIG. 7 is a schematic view of the centrifugal clutch assembly of FIG. 6 with the back plate moved rearward.

Referring to FIG. 7, the clutch assembly 80 is schematically shown with the back plate 62 in a substantially rearward position. In this position, the clamping force increase resulting from axial movement of the front plate 26 is reduced. The reduction in clamping force increases the rotational speed required to begin engagement of the clutch assembly 80.

Centrifugal clutch assemblies designed with the benefit of this disclosure provide for dynamic alteration of clutch engagement speeds. The dynamic alteration of engagement speeds provides for adaptation of clutch engagement to driving conditions and vehicle conditions to improve vehicle handling and increases clutch assembly life.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A normally open clutch assembly comprising:
    a clutch cover attachable to a rotatable input member;
    a friction disk;
    a pressure plate rotatable with said clutch cover and movable axially between a clamped position engaging said friction disk and an open position;
    a plurality weights movable responsive to rotation of said normally open clutch assembly to move said pressure plate between said clamped position and said open position;
    a front plate and a back plate defining a radial space within which said plurality of weights move, said back plate movable axially to change an engagement force between said pressure plate and said friction disk;
    a spring that moves said back plate; and a release bearing moveable axially and engaged to move said spring.

2. The assembly as recited in claim 1, comprising a biasing member disposed between said back plate and said clutch cover.

3. A normally open clutch assembly comprising:
a clutch cover attachable to a rotatable input member;
a friction disk;
a pressure plate rotatable with said clutch cover and movable axially between a clamped position engaging said friction disk and an open position;
a plurality of weights movable responsive to rotation of said normally open clutch assembly to move said pressure plate between said clamped position and said open position;
a front plate and a back plate defining a radial space within which said plurality of weights move, said front plate movable radially to change an engagement force between said pressure plate and said friction disk.

4. The assembly as recited in claim 3, wherein each of said plurality of weights includes a rolling member, said rolling member movable along opposing surfaces of said front plate and said back plate.

5. The assembly as recited in claim 4, wherein said front plate includes a ramped surface and said rolling member is movable along said ramped surface to move said front plate axially away from said back plate.

6. The assembly as recited in claim 5, comprising an adjustable member that adjusts a radial position of said front plate.

7. The assembly as recited in claim 6, wherein said ramped surface is fixed to said front plate and radial movement of said front plate changes a radial distance at which said rolling member engages said ramped surface.

8. A normally open clutch assembly comprising:
a clutch cover attachable to a rotatable input member;
a friction disk;
a pressure plate rotatable with said clutch cover and movable axially between a clamped position engaging said friction disk and an open position;
a plurality of weights movable responsive to rotation of said normally open clutch assembly to move said pressure plate between said clamped position and said open position;
a front plate and a back plate defining a radial space within which said plurality of weights move;
an adjustment member that moves said back plate; and
a release bearing that moves said adjustment member, wherein said back plate is movable axially to change an engagement force between said pressure plate and said friction disk.

9. The assembly as recited in claim 8, wherein each of said plurality of weights includes a rolling member, said rolling member movable along opposing surfaces of said front plate and said back plate.

10. The assembly as recited in claim 9, wherein said front plate includes a ramped surface and said rolling member is movable along said ramped surface to move said front plate axially away from said back plate.

11. The assembly as recited in claim 8, wherein said adjustment member comprises a spring.

12. The assembly as recited in claim 8, comprising an actuator that drives said release bearing.

13. The assembly as recited in claim 8, comprising a biasing member disposed between said back plate and said clutch cover.

* * * * *

UNITED STATES PATENT AND TRADEMARK OFFICE
CERTIFICATE OF CORRECTION

PATENT NO. : 7,306,084 B2
APPLICATION NO. : 10/745095
DATED : December 11, 2007
INVENTOR(S) : AbuSamra et al.

It is certified that error appears in the above-identified patent and that said Letters Patent is hereby corrected as shown below:

Claim 1, Column 4, line 59: insert --of-- after "plurality" and before "weights"

Signed and Sealed this

Twenty-ninth Day of April, 2008

JON W. DUDAS
*Director of the United States Patent and Trademark Office*